G. F. POPE.
CHANGE SPEED GEARING.
APPLICATION FILED MAY 3, 1920.

1,410,347.

Patented Mar. 21, 1922.
2 SHEETS—SHEET 1.

Inventor:
George F. Pope
By Fillson Fillson
Attys.

G. F. POPE.
CHANGE SPEED GEARING.
APPLICATION FILED MAY 3, 1920.
1,410,347.
Patented Mar. 21, 1922.
2 SHEETS—SHEET 2.
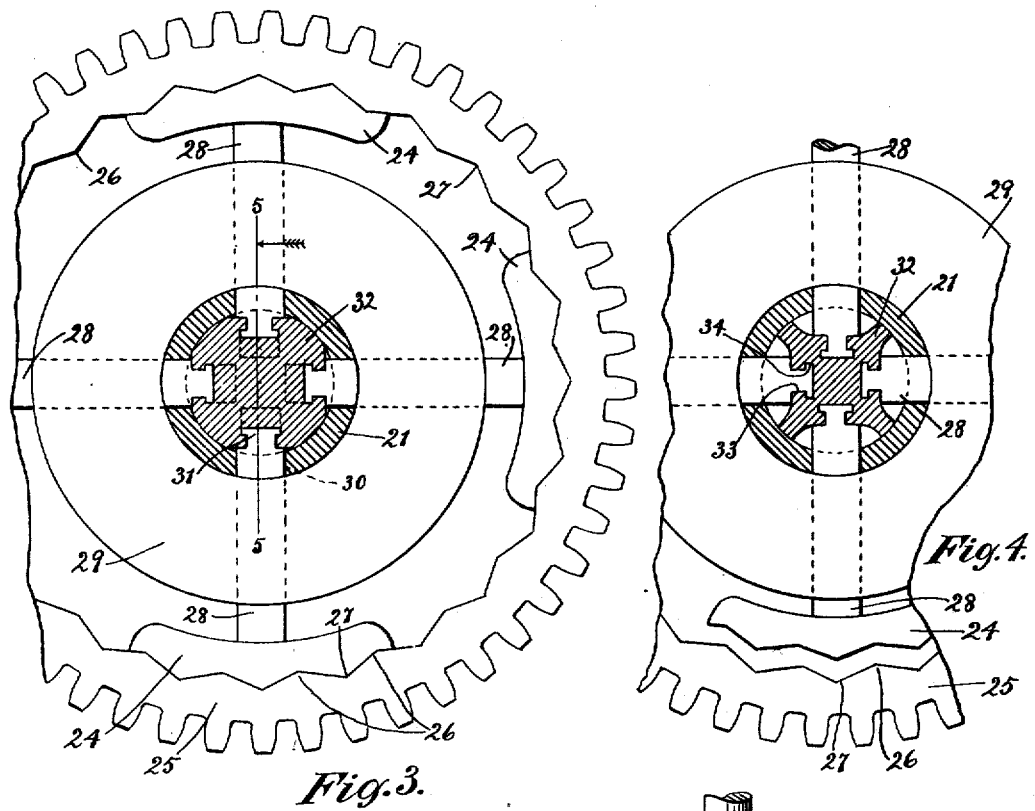
Fig. 3.
Fig. 4.
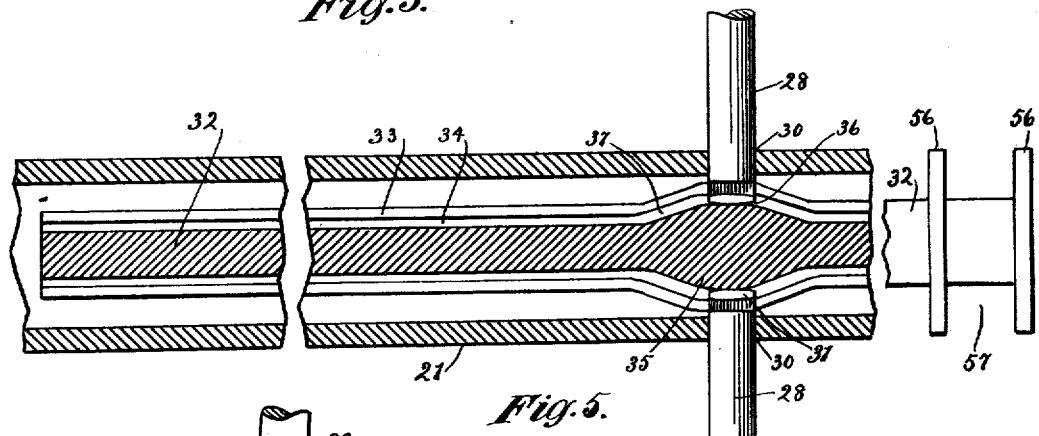
Fig. 5.
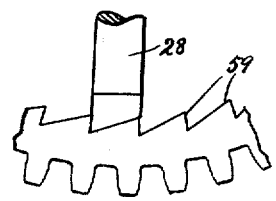
Fig. 6.
Inventor:
George F. Pope
By
Attys.

UNITED STATES PATENT OFFICE.

GEORGE F. POPE, OF SHABBONA, ILLINOIS.

CHANGE-SPEED GEARING.

1,410,347.   Specification of Letters Patent.   Patented Mar. 21, 1922.

Application filed May 3, 1920.   Serial No. 378,471.

*To all whom it may concern:*

Be it known that I, GEORGE F. POPE, a citizen of the United States, and resident of Shabbona, county of De Kalb, and State of Illinois, have invented certain new and useful Improvements in Change-Speed Gearing, of which the following is a specification, and which are illustrated in the accompanying drawings, forming a part thereof.

The invention relates to change speed transmission gearing, and has for an object the provision of a mechanism of this nature wherein the different pairs of gears will be always in mesh and therefore it will not be necessary to slide gears together while revolving.

A further object of the invention is the provision of transmission gearing that will be more compact than mechanism now used for a like purpose.

An illustrative embodiment of the invention is shown in the accompanying drawings, in which—

Fig. 3 is a detail section taken on line 3—3 of Fig. 2, drawn to an enlarged scale;

Fig. 4 is a detail section corresponding to portions of Fig. 3 showing the clutch members thrown out of contact;

Fig. 5 is a detail section on line 5—5 of Fig. 3; and

Fig. 6 is a detail section, corresponding to a portion of Fig. 3, illustrating a modified form of clutch.

Figure 2:
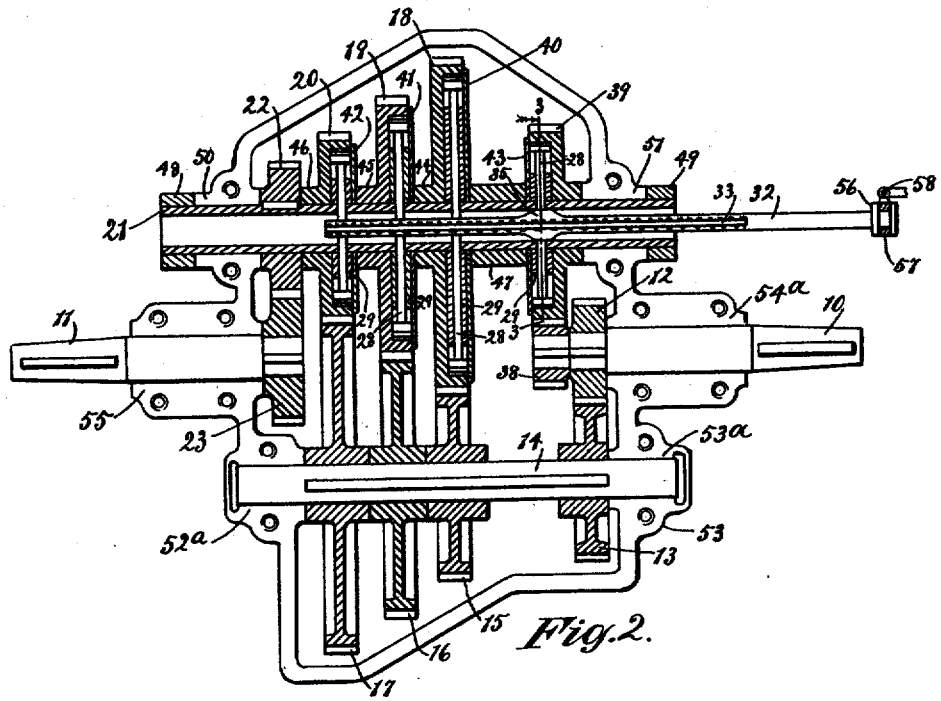
Fig. 2 is a central horizontal section on line 2—2 of Fig. 1.
Figure 1:
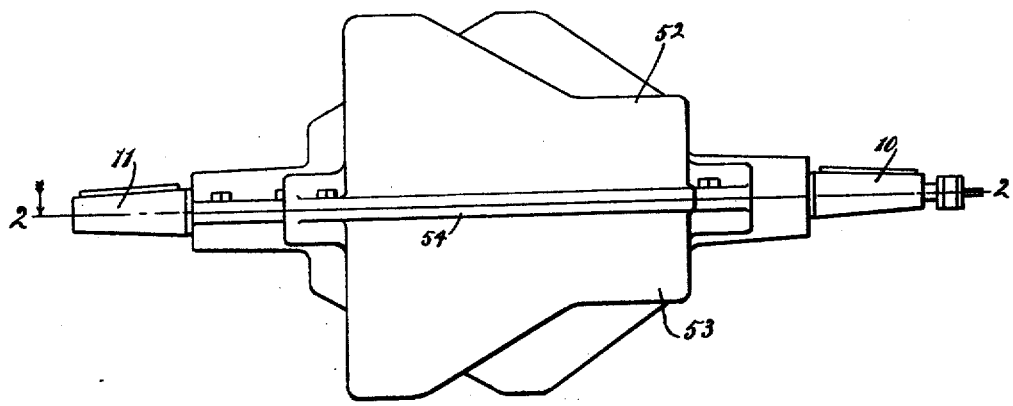
Fig. 1 is a side elevation of a case adapted to contain the mechanism.

In the form of the invention illustrated, stub shaft 10 is designed to be connected to an engine or other source of power, and stub shaft 11 to be connected to any device, as a propeller shaft of an automobile, which it is desired to drive at speeds bearing different ratios to the speed of stub shaft 10.

To transmit power from shaft 10 a gear 12 is shown rigidly secured thereto, meshing with a gear 13 rigidly secured to a countershaft 14. Also rigidly secured to shaft 14 there are shown gears 15, 16 and 17, of different and successively greater diameters. Constantly in mesh with gears 15, 16 and 17, and therefore continuously rotating in unison therewith, are gears 18, 19 and 20, which are loosely mounted on countershaft 21. To transmit rotation of countershaft 21 to stub shaft 11 there is shown a gear 22, rigidly secured to countershaft 21, and a gear 23 rigid with stub shaft 11 and meshing with gear 22.

With the arrangement described the countershaft 14, gears 15, 16 and 17 rigid therewith, and gears 18, 19 and 20 meshing with gears 15, 16 and 17, will be in continuous rotation when the stub shaft 10 is revolving. Under these circumstances it is only necessary to attach the selected one of gears 18, 19 or 20 to countershaft 21 to cause this shaft and stub shaft 11 to revolve at a speed depending on the size of the gears 15, 16 or 17, and 18, 19 or 20, which are in mesh.

To attach one of the gears 18, 19 or 20 at will to shaft 21, a clutch for each of these gears, of the form illustrated in detail in Figs. 3, 4 and 5, may be utilized. In this form of clutch shoes, as 24, shown as four in number, are brought forcibly into contact with the inner surface of the rim 25 of the gear, and hence the shoes 24 and parts connected therewith are forced to rotate with the gear. As shown, the inner surface of the rim 25 of the gear is formed with projections 26, separated by depressions 27, and the shoes 24 are made of a form complemental to the form of the rim.

To control the action of the shoes 24, there is shown a pin 28 rigidly secured to each shoe and projecting radially through a collar 29 secured to the shaft 21, and through a hole 30 into the shaft 21 which is shown as being hollow. A T-shaped head 31 is formed upon each pin 28.

To actuate pins 28 a cam rod 32 is shown adapted to slide within the hollow shaft and having longitudinal grooves 33 therein, equal in number to the pins 28. The grooves 33 are each shown as having an enlarged interior at 34, so as to provide a cross-section complemental in form to the form of each T-shaped head 31. To cause the pins 28 to reciprocate, the bottoms of the grooves 33 are each formed into a cam elevation, as shown at 35, each cam 35 being at the same longitudinal location upon the cam rod. Not only the bottom but the entire cross-section of each groove 33 partakes of the radial displacement of the cam form. Hence, when the cam rod with the T heads 31 assembled is reciprocated in hollow shaft 21 the pins 28 of each gear 18, 19, 20, will in turn be positively forced out to cause the corresponding clutch to be thrown in, and then will be positively drawn in to disengage the corresponding clutch.

By sliding the cam rod to the proper point any one of the gears can thus be brought into operation, and it is impossible to have more than one set of gears operative at any given time. To pass from high to low or from low to high it is necessary to pass through the intermediate gear, but since such operation is merely a question of simple reciprocation of the cam rod for a limited distance, and no gears have to be brought into and out of mesh, the action is not objectionable.

To permit the wings of the T heads 31 to follow the cam form of the grooves 33, 34, the ends of these wings are slightly tapered, as shown at 36. Moreover, the depth of the portion 34 of these grooves is preferably increased somewhat in the cam portion, as shown at 37.

To provide a reversal of direction of shaft 11 from the direction of rotation produced by gears 15, 16 or 17 coacting with gears 18, 19 or 20, a gear 38 is shown rigidly secured upon stub shaft 10 and meshing with a gear 39 loose upon shaft 21. Gear 39 is supplied with a clutch mechanism in all respects similar to that described in connection with gears 18, 19 and 20. When the clutch mechanism in connection with gear 39 is thrown into action to secure this gear to shaft 21, the direction of shaft 21 will be reversed, as stated.

To close the space within the rim of each gear 18, 19, 20 and 39, occupied by the clutches, plates, as 40, 41, 42 and 43 may be provided, preferably being loosely placed upon shaft 21 and held in place by the extensions 44, 45 or 46 of the hubs of the gears, or, in the case of plates 40 and 43, by a collar 47 slipped upon shaft 21. To preserve the shaft 21 from endwise movement collars 48 and 49 are shown secured to the ends thereof outside its journals 50, 51.

To enclose the gear set a case 52, 53, is shown as formed in two halves united by a flange 54, which may be bolted together and supplied with a gasket, in a well known manner, thereby being made oil-tight. The journals 50, 51, 52ª, 53ª, 54ª, 55, for the various shafts may be formed in the halves 52, 53, of the casing.

The end of the cam rod 32 is shown as provided with a collar 56, having a circumferential channel 57 adapted to coact with an operating yoke 58, in order that the rod may be caused to reciprocate by means of the yoke while freely rotating.

A modified form of clutch projections 59 is shown in Fig. 6, which form will not produce so much end pressure on pins 28 as the form of Fig. 3. This or any of many other forms of projections might be used without departing from the spirit of my invention. I do not wish to limit myself to the exact arrangement of stub and countershafts shown, since many modifications might be made in the arrangement of the shafting, as well as in the forms of the clutches and in other details of the physical embodiment of the invention, the forms shown being illustrative only.

I claim as my invention—

A change speed gearing comprising, in combination, a power shaft having a plurality of gears rigidly secured thereto, a driving shaft having a gear meshing with one of the gears on said power shaft, a third shaft adapted to be driven from the driving shaft, a plurality of coacting gears of different ratios, one gear of each pair loose upon one and the other gear of each pair rigidly secured to the other of said two last-mentioned shafts, an additional loose gear upon one of the last-mentioned shafts and meshing with one of the gears on said power shaft, and means to secure a selected one of said loose gears to its shaft and release the same therefrom while the gears are rotating.

GEORGE F. POPE.